July 13, 1926.  1,592,789

M. THIRY

FRICTION CLUTCH

Filed August 7, 1923

Inventor
M. Thiry
By Jno. [illegible]
Atty.

Patented July 13, 1926.

1,592,789

UNITED STATES PATENT OFFICE.

MAURICE THIRY, OF ST.-SERVAIS, BELGIUM.

FRICTION CLUTCH.

Application filed August 7, 1923, Serial No. 656,287, and in Belgium August 12, 1922.

My invention relates to improvements in friction clutches of the well known type in which an expansion ring member or band is mounted between the rim of an inner clutch body or casing which is keyed upon a shaft and the inner periphery of an outer casing mounted so as to be rotated either by another shaft or by a pulley or toothed wheel suitably driven by the motive power.

One object of my invention is to simplify the construction of clutches of this type and more particularly to reduce to a minimum the number of elements which are necessary to cause the operation of the expansion ring member or band.

A further object of my invention is to provide improved means whereby the expansion ring member can be maintained positively in both clutching and unclutching position that is to say in contact with the inner periphery of the outer casing cooperating with the motor shaft or in contact with the outer rim of the inner clutch body keyed on the driven shaft.

A still further object of my invention consists in so arranging the co-acting elements of the clutch operating mechanism that the power required by the manual operation will be reduced to a minimum.

With these objects in view by invention essentially consists in the special combinations and arrangements of parts as will be hereinafter fully described and pointed out in the appended claims.

Referring to the annexed drawings which show as an example one embodiment of my invention:

Figure 1:
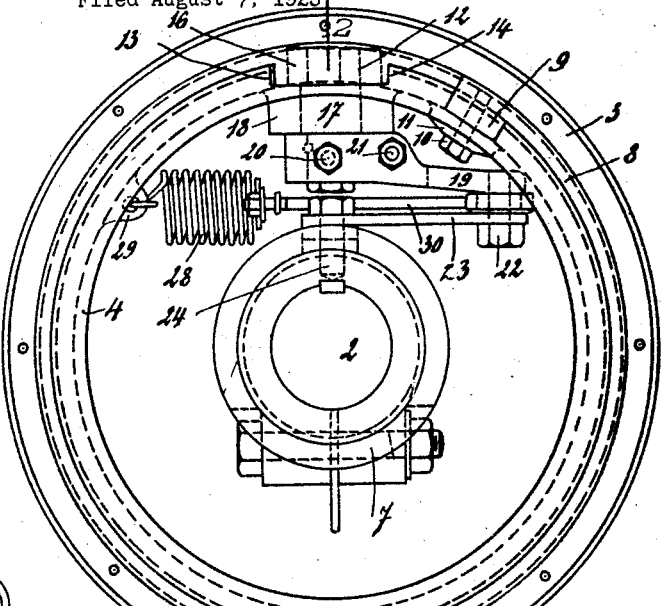
Fig. 1 is a front view of the friction clutch.

In this drawing 3 represents a casing having a hub 3' adapted to rotate upon a sleeve 1 keyed on the shaft 2 which is to be driven. In the example shown it has been supposed that the clutch is driven by a pulley or by a toothed wheel mounted on the hub 3' but not shown on the drawing and rotates consequently freely on the sleeve 1.

Figure 2:
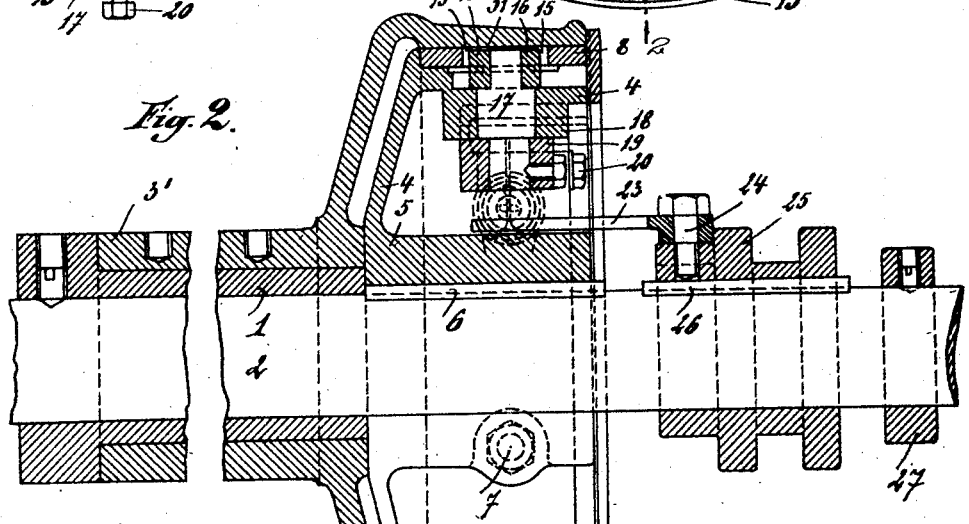
Fig. 2 is a transverse section taken on line 2—2 in Fig. 1.
Figure 4:
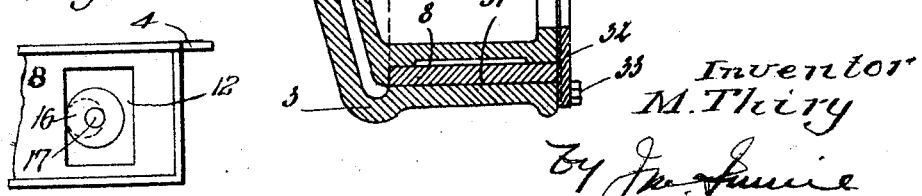
Fig. 4 is a broken plan showing the mounting of the friction band.

In the casing 3 is placed a second casing or clutch body 4 forming a hub 5 which is keyed on the shaft 2 by means of a key 6 and a tightening bolt 7. The second casing or clutch body 4 acts as a guide and carrier for an expansion ring member or band 8 which is engaged at one end by a boss 9 in a corresponding cut out portion provided in the clutch body 4. A screw 10 and a spring washer 11 (Fig. 1) secure the elastic tightening of the boss 9 of the ring member 8 on the body 4. The other end of the ring member 8 carries another boss 12 which is engaged with a play 13 in a cavity 14 provided in the clutch body 4. The second boss 12 of the ring member is provided with a slide 15 (Fig. 2) in which a roller 16 is adapted to rotate; the said roller is mounted on the eccentric end of a spindle 17 pivoting in a guide 18 cast with the body or casing 4. On the said spindle 17 a lever 19 is keyed by aid of a screw 20 and a bolt 21. The said lever 19 is pivotally connected by a screw 22 to a link 23 adapted to pivot by a screw 24 in a sleeve 25 sliding on the shaft 2 along a key 26. The position of this sliding sleeve 25 may be limited by a collar 27 fixed on the shaft 2.

The lever 19 is maintained in two end positions by the action of a spring 28 (Fig. 1) attached at one end to an eye 29 which is provided on the casing 4 and at the other end to a threaded rod 30 ending in a ring surrounding a projection on lever 19, between the said lever and link 23. A protecting ring 32 is fixed on the casing 3 by screws 33 (Fig. 2) and forms together with the casings 3 and 4, an oil case for lubricating the clutch.

When the friction clutch is at rest, that is to say in its unclutched position, the expansion ring member or band 8 is maintained in contact with the outer rim of the casing 4 in such a manner that no friction or rubbing can take place between the said band and the inner peripheral surface or friction surface 31 of the outer casing 3. When it is desired to clutch, the sliding sleeve 25 is displaced in the ordinary and well known manner along the shaft 2 so as to cause by aid of link 23 and lever 19, a partial rotation of the spindle 17.

Figure 3:
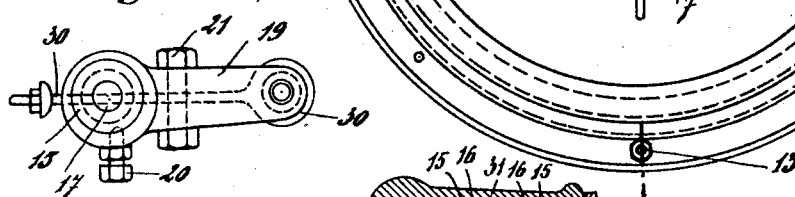
Fig. 3 shows a detail the said figure giving a top view of the operating lever in its middle position.

As a consequence the eccentric end of the said spindle displaces the roller 16 in the slide 15 of the expansion ring member or band 8 in such a manner that the said roller causes the expansion of the said band, applying the same against the friction surface 31 of the outer casing 3. The frictional contact of the band then takes place on the whole surface of the band. When lever 19 and link 23 have been sufficiently displaced in such a manner that lever 19 has passed beyond the middle position shown in Fig. 3, both elements (lever 19 and link 23) are maintained in their new position under the action of spring 28 which pulls upon the point of pivotal connection 22 of lever 19 and link 23. Spring 28 effects a corresponding traction on the said pivotal connection 22 when the sleeve 25 is moved in the opposite direction, that is to say when it is moved towards the collar 27 in order to bring the expansion ring or band 8 to the unclutched position. In this case as soon as lever 19 has passed the middle position shown in Fig. 3, whilst moving in the opposite direction, it maintains the expansion band 8 in the unclutched position, this result being secured by the simple pivotal connection 22 between lever 19 and link 23, on which spring 28 acts directly without any auxiliary mechanism.

It will be observed consequently that in the above described construction the spring 28 on account of its cooperation with lever 19 and link 23 acts as a force to bring the expansion band 8 either to its clutching or unclutching position and also to maintain positively the said band in each of the said positions which greatly facilitates the manual operation of the clutch.

Having thus described my invention, what I claim is:

In a friction clutch, an outer casing, an inner clutch body, an expansion ring member or band located between the outer casing and the inner clutch body, the said band being attached at one end to the said inner body and being engaged at the other end in a cavity of the said inner body, a spindle pivotally mounted on the inner body, an eccentric end for the said spindle, a roller on the said end, a slide provided in the end of the expansion ring band and in which the said roller is engaged, a lever on the said spindle, a link pivotally connected to said lever, a sliding sleeve coacting with the said link and a tension spring acting on the pivotal connection of the lever and link, whereby when the lever has been displaced beyond a middle position, it is automatically brought to and maintained by the tension-spring in each of its end positions.

MAURICE THIRY.